L. J. PEARSON AND W. E. HOLLAND.
METHOD AND MACHINE FOR MAKING STORAGE BATTERY GRIDS.
APPLICATION FILED JUNE 19, 1918.
1,329,999.
Patented Feb. 3, 1920.
2 SHEETS—SHEET 2.
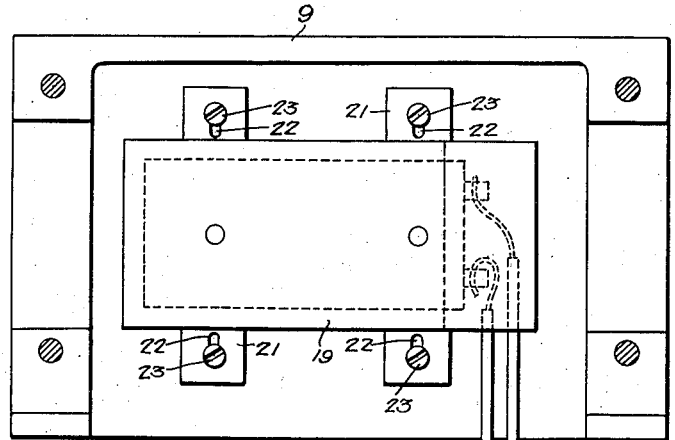
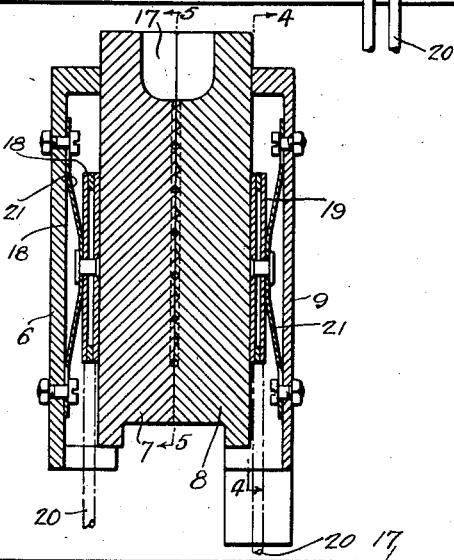
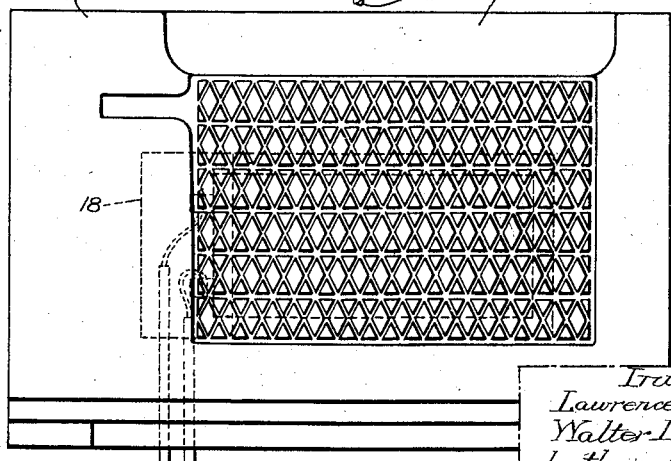

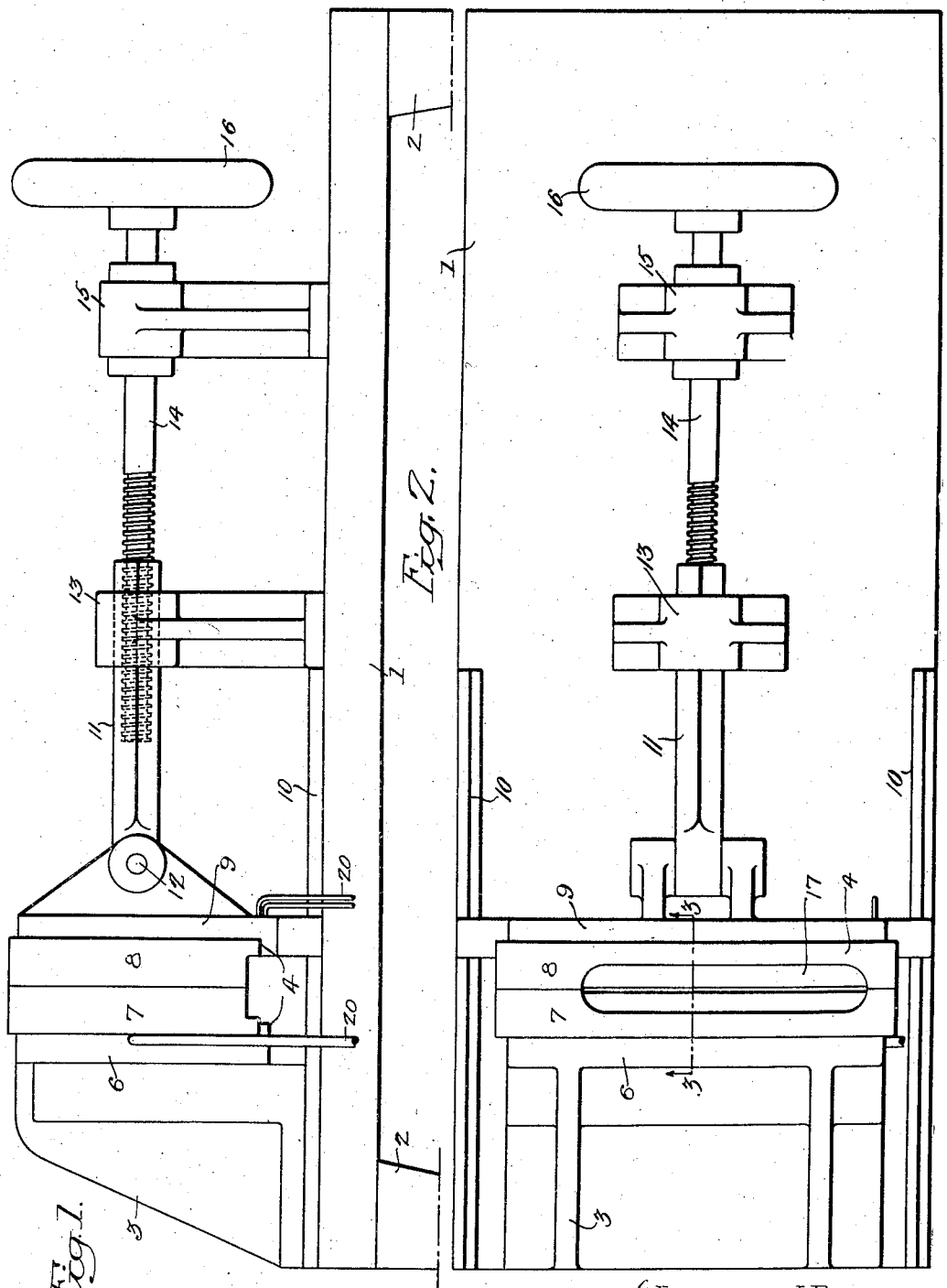

UNITED STATES PATENT OFFICE.

LAWRENCE J. PEARSON, OF WILLOW GROVE, AND WALTER E. HOLLAND, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

METHOD AND MACHINE FOR MAKING STORAGE-BATTERY GRIDS.

1,329,999. Specification of Letters Patent. Patented Feb. 3, 1920.

Application filed June 19, 1918. Serial No. 240,789.

*To all whom it may concern:*

Be it known that we, LAWRENCE J. PEARSON and WALTER E. HOLLAND, citizens of the United States, residing in Willow Grove and Philadelphia, respectively, in the State of Pennsylvania, have invented Methods and Machines for Making Storage-Battery Grids, of which the following is a specification.

As a result of extended examination and experiment we have found that the plate frames or grids of storage batteries as ordinarily made are not only porous but are of a non-uniform structure, so that oxidation and ultimate disintegration occurs sooner than would be the case if they were of a closer texture and in addition they buckle or become distorted under certain operating conditions because this oxidation is uneven owing to such non-uniform structure. This objectionable condition we have found to be due largely to the uneven heating of the molds in which the grids were cast as well as to the fact that the heating means employed were necessarily operated with certain portions of the molds at such a high temperature that the porous castings and non-uniform structure naturally resulted;—it being noted that the porosity of the lead alloy castings for battery grids increases as the mold temperature is raised. One object therefore, of our invention is to provide a simple, practical and inexpensive method of making storage battery grids so that they shall be more compact than in the past and of uniform density at all points.

Another object of our invention is to provide a relatively simple and substantial machine whereby it shall be possible to make flat or relatively thin castings, particularly storage battery grids, which shall have both sides of uniform structure or density and in which the arrangement and construction shall be such as to maintain both parts of the mold in which the casting is made at the same temperature.

We further desire to provide a novel form of electric heating means whereby both parts of a mold shall be maintained at the same temperature under operating conditions and shall be subject to exact control;—the invention contemplating a construction whereby it shall be possible to conveniently remove and replace the molding members or dies without interfering with the heating units therefor.

Another object of our invention is to provide a novel form of electric heating unit for a casting machine which shall include novel means for insuring efficient and uniform conduction of heat to the parts of the mold with a view to maintaining these at the same temperature.

We further desire to provide means for heating the parts of a mold which shall be of such construction and disposition of parts as to render possible the operation of the molds at a lower maximum and more evenly distributed temperature than has hitherto been possible for the same work, with a view to producing castings, and more particularly storage battery grids, of improved structure as regards their density, homogeneity and freedom from porosity.

These objects and other advantageous ends we attain as hereinafter set forth, reference being had to the accompanying drawings, in which, Figures 1 and 2 are respectively a side elevation and a plan of a casting machine constructed according to our invention;

Fig. 3 is a transverse vertical section on the line 3—3 Fig. 2; and

Fig. 4 and Fig. 5 are respectively vertical sections on the lines 4—4 and 5—5, Fig. 3.

In the above drawings, 1 represents a supporting base, which in the case illustrated, forms the top of a table-like structure having legs 2, and this at one end has an upwardly projecting portion or standard 3 designed to carry one part 7 of a mold 4 through an intermediate supporting member 6. The second part 8 of said mold is carried on a member 9 slidably mounted on guides 10 forming part of or attached to the base 1 and may be moved toward or from the fixed part 7 by any suitable mechanical means, which we have illustrated in the present instance as consisting of an internally threaded tube 11 hinged at one end to the movable member 9 by a pin 12 and slidable longitudinally through a bearing 13 carried by the base structure.

A spindle 14 is threaded into the opposite end of the tubular structure 11 and is supported in a bearing 15 so as to be held from longitudinal movement while being free to rotate when a hand wheel 16 fixed to its outer end is turned. The supporting member 6 is held to the fixed standard 3 by any suitable means or it may be formed as part of the same, and has the form of a flat hollow structure open at its outer face, with its lower edge extended to carry the part 7 of the mold, whose outside face rests against the outer edge of the top of said supporting structure.

As illustrated in the drawings, the two mold parts 7 and 8 are of substantially identical construction, having flat outer faces and formed with their adjacent or contacting faces suitably recessed to define a grid which it is desired to cast. The upper top portions of the two parts 7 and 8 are recessed to provide a gate 17 for the reception of the molten metal of which the grid is to be cast and, in order that such metal shall flow throughout the recesses of the mold, as well as for the purpose of insuring that the casting shall be of a uniform structure, we provide means for electrically heating said two mold parts.

For this purpose we provide a pair of heating units 18 and 19 in the form of flat elongated metal plates having embedded within them insulated electric conductors of high electrical resistance (not specifically illustrated) whose terminal connections are indicated at 20. One face of each of these plates is not only flat but is made as smooth as possible in order that it may make the most intimate contact with the similarly smooth outer face of its coacting mold part 7 or 8, as the case may be, and in order to insure each unit being held closely to such part, we mount it upon a pair of spring plates or strips 21. Each of these latter, as shown in Fig. 4, is rigidly fastened at its middle point to its heating unit and its ends are movably connected to the supporting structure 6 or 9, as the case may be, for which purpose they are formed with slots 22 for the reception of screws 23 in said structure.

With this construction, when the mold parts are mounted upon the ledges provided by the supporting structures 6 and 9, their outer faces are respectively engaged by the flat faces of the heating units and the springs 21 are so designed or adjusted that when the mold parts are bolted home said springs will straighten out from their normal bowed condition to a greater or less extent and maintain the heating units in the most intimate contact with the mold parts 7 and 8. If now the heating units be supplied with a suitable electric current, the mold will be brought to and, under operating conditions, will be maintained at a definite temperature which, it is to be noted, will be equal at opposite points throughout the two mold parts and will be subject to exact control. It is obvious that inequalities in mold parts and supporting structures can be compensated for by suitable changes in shape, location, and electrical capacity of the heating units and similarly, the decreasing temperature of the molten metal as it flows from the gate, can also be compensated for in like manner.

If molten metal, having the composition required for storage battery grids, be poured into the gate 17, it will distribute itself throughout the various channels and recesses of the mold parts and after it has solidified, may be removed in the customary manner when the mold parts have been separated. The grid thus formed will be found not only comparatively dense but in addition, will be of a uniform structure or compactness at all points.

By our invention it is possible, since the temperature of the mold parts is uniform at all points, to have such temperature comparatively low, i. e., merely high enough to maintain the necessary fluidity of the metal during the casting operation. As a consequence therefore, the finished castings have a greater density or are more compact than if they had been made at a higher temperature and their structure is uniform throughout because of the uniform temperature of the mold parts engaged by the molten metal.

We claim:

1. The combination of a mold made in a plurality of separable parts; and means for maintaining the metal shaping portions of the adjacent faces of said parts at the same temperature under operating conditions.

2. The combination of a mold including two parts having faces formed to define an object to be cast; means for separably holding the parts with said faces adjacent each other; and heating means for maintaining the operative parts of said faces at the same temperature.

3. The combination of a mold made in a plurality of separable parts; and independent means for maintaining the adjacent portions of said parts at the same temperature under operating conditions.

4. The combination of a mold made in a plurality of separable parts; and electric devices mounted to uniformly heat the adjacent faces of said parts respectively.

5. The combination in a mold of a plurality of separable parts; supporting structures for said parts; means for holding the parts together during the casting operation; and electrical heating devices carried by said supporting structures and arranged to maintain all portions of the coacting faces of said mold parts at a uniform temperature under operating conditions.

6. The combination in a casting machine of a supporting structure; two holders mounted thereon and relatively movable toward and from each other; a mold made in a plurality of parts carried by said holders and each having a smooth external face; with heating units mounted on said holders and having smooth portions coacting with the corresponding portions of the mold parts to maintain all portions of the coacting faces of said parts at a uniform temperature under operating conditions.

7. The combination in a casting machine of a supporting structure; holders mounted thereon and relatively movable toward and from each other; heating units yieldingly carried by the holders; and a mold made in a plurality of parts supported by the holders in positions to be intimately engaged by the heating units.

8. The combination of a supporting structure; holders mounted thereon; means for moving one of the holders toward and from the other; flat faced heating units yieldingly carried by the holders respectively; and a mold made in a plurality of sections respectively carried by the holders and each having a flat face placed to be engaged by the flat face of the heating unit carried by the same holder.

9. The combination in a casting machine of supporting structures; two hollow holders mounted thereon; means for moving one of said holders toward and from the other; heating units in the form of flat plates carried within the hollows of said holders; springs on the heating units yieldingly engaging the holders; and a mold made in a plurality of sections respectively supported by the holders and having flat faces engaging the faces of the adjacent heating units.

In witness whereof we affix our signatures.

LAWRENCE J. PEARSON.
WALTER E. HOLLAND.